United States Patent
Klepka et al.

(10) Patent No.: US 8,602,571 B2
(45) Date of Patent: Dec. 10, 2013

(54) MIRROR ARRANGEMENT FOR MONITORING A PASSENGER CABIN OF AN AIRCRAFT

(75) Inventors: Frank Klepka, Berlin (DE); Stephan Waetzold, Hamburg (DE); Wolfgang Moeller, Itzehoe (DE)

(73) Assignee: Airbus Operations GmbH, Hamburg (DE)

( * ) Notice: Subject to any disclaimer, the term of this patent is extended or adjusted under 35 U.S.C. 154(b) by 117 days.

(21) Appl. No.: 13/189,025

(22) Filed: Jul. 22, 2011

(65) Prior Publication Data
US 2012/0019944 A1    Jan. 26, 2012

Related U.S. Application Data

(60) Provisional application No. 61/366,972, filed on Jul. 23, 2010.

(30) Foreign Application Priority Data

Jul. 23, 2010 (DE) .......................... 10 2010 032 054

(51) Int. Cl.
*G02B 5/08* (2006.01)
*G02B 7/182* (2006.01)

(52) U.S. Cl.
USPC ............ 359/841; 359/872; 359/875; 359/881

(58) Field of Classification Search
USPC .......................................... 359/881
See application file for complete search history.

(56) References Cited

U.S. PATENT DOCUMENTS

| | | | |
|---|---|---|---|
| 593,043 A | 11/1897 | Cochran et al. | |
| 642,162 A | 1/1900 | Seabury et al. | |
| 1,965,788 A | 7/1934 | Akiyoshi | |
| 3,680,499 A | 8/1972 | Boudreau | |
| 5,847,889 A | 12/1998 | Komiyama et al. | |
| 7,600,879 B1 | 10/2009 | Reynolds | |
| 2008/0122239 A1* | 5/2008 | May et al. ................. | 296/24.34 |

FOREIGN PATENT DOCUMENTS

JP    2003312348 A    11/2003

OTHER PUBLICATIONS

European Search Report, EP 11 005 474, Oct. 14, 2011.
English Abstract of JP2003312348(A), Nov. 6, 2003.

* cited by examiner

*Primary Examiner* — Jade R Chwasz
(74) *Attorney, Agent, or Firm* — Krieg DeVault, LLP

(57) ABSTRACT

A mirror arrangement (10) for monitoring a passenger cabin of an aircraft is disclosed, comprising at least one mirror element (40) for reflecting light and a mirror mount (20) for fastening the at least one mirror element (40) inside the passenger cabin, the mirror mount (20) comprising a holder (22), to which the at least one mirror element (40) is fastenable and which is displaceable relative to the passenger cabin.

9 Claims, 4 Drawing Sheets

US 8,602,571 B2

MIRROR ARRANGEMENT FOR MONITORING A PASSENGER CABIN OF AN AIRCRAFT

CROSS REFERENCE TO RELATED APPLICATIONS

Figure 1:
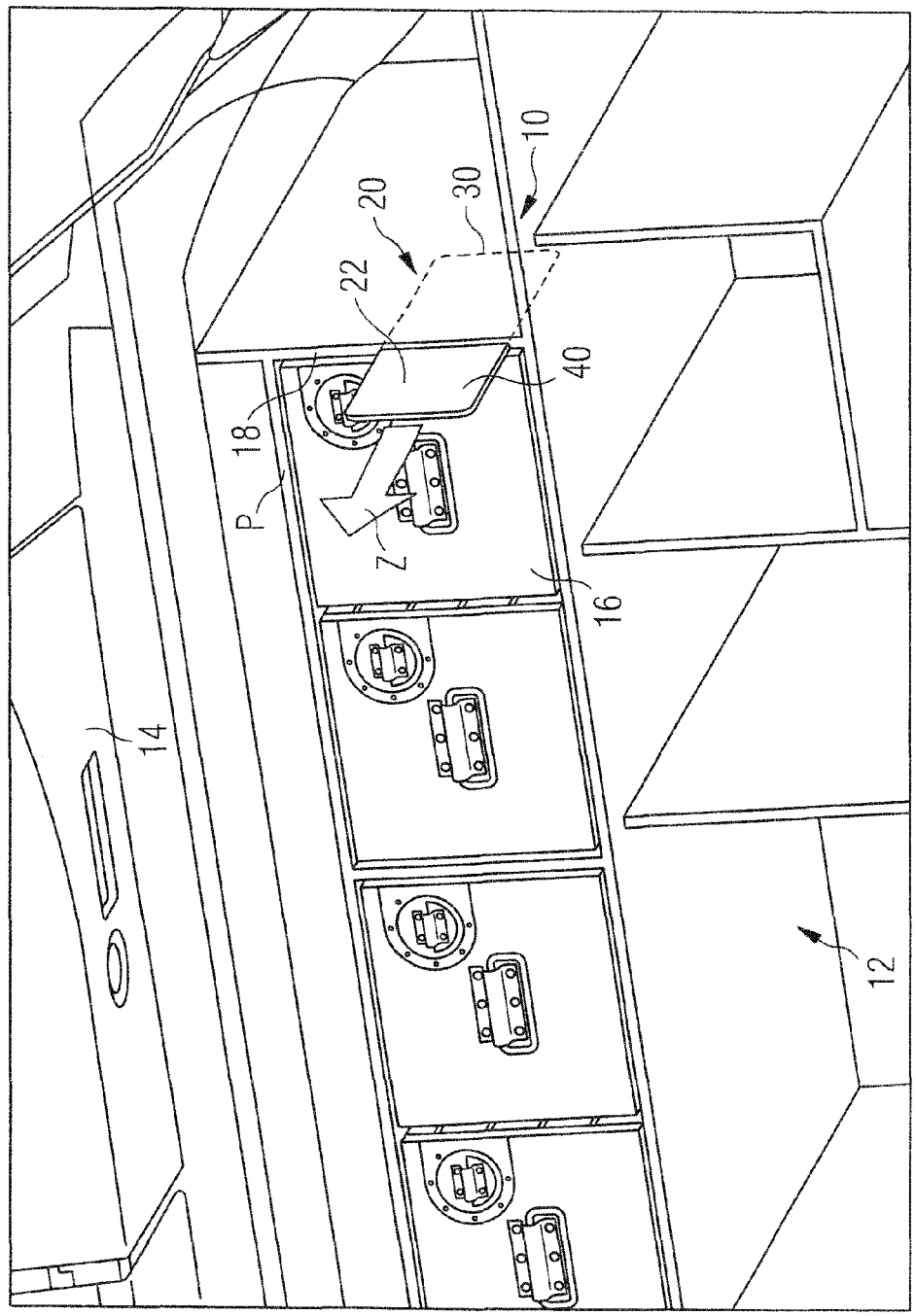

The present application claims the benefit of U.S. Provisional Application No. 61/366,972, filed Jul. 23, 2010 and also claims priority to German Patent Application No. 10 2010 032 054.4, filed Jul. 23, 2010, each of which is incorporated herein by reference.

The present invention relates to a mirror arrangement for monitoring a passenger cabin of an aircraft. The mirror arrangement comprises at least one mirror element for reflecting light and a mirror mount for fastening the at least one mirror element inside the passenger cabin.

Among the principal tasks of the flight crew in the passenger cabin (flight attendants) are those of ensuring the safety of and looking after the passengers. In particular, to ensure the safety of the passengers in the passenger or aircraft cabin, it is therefore necessary for the flight attendants to keep an eye on what is happening in the passenger cabin.

In recent years, the size of commercial aircraft and the number of passengers per commercial aircraft have increased sharply, so that it has become more and more difficult for the flight attendants to watch over the entire passenger cabin or the respectively assigned area of the passenger cabin. Moreover, passenger cabins of modern aircraft are often subdivided into individual areas by various fittings. Such fittings (so-called monuments) comprise, for example, a galley, lavatories or the flight crew rest compartment, FCRC). Fittings of this kind may additionally obstruct the view of the flight attendants. The same applies, where appropriate, to partition walls or curtains which may be arranged between the different seating classes of the passenger cabin (e.g. First Class, Business Class and Economy Class) for the separation thereof.

Particularly in situations where the flight attendants themselves are required to occupy their seats, for example during take-off and landing of an aircraft or in the event of turbulence during the flight, watching over the passenger cabin or the assigned area of the passenger cabin is made considerably more difficult for the flight attendants.

In order to overcome this problem, it is already known from the prior art to fit a mirror on a cabin interior wall of the aircraft cabin, so that a flight attendant even when occupying his or her seat can watch over a rear part of the passenger cabin via the mirror. In a known solution, the mirror has a convex shape and thereby enables an enlarged angle of view compared with a flat mirror. However, such a convexly shaped mirror takes up a greater installation space than a flat mirror, which in practice may cause problems.

Although an alternative solution with a flat mirror takes up a smaller installation space in the passenger cabin, the angle of view provided by the mirror is reduced compared with the solution with a convex mirror, so that with a flat mirror a flight attendant can only watch over a smaller part of the passenger cabin.

From U.S. Pat. No. 5,847,889 there is known a further mirror arrangement, in which the mirror owing to its design in the manner of a Fresnel lens enables a comparatively wide angle of view and at the same time has a flat shape. Nevertheless, in practice, as surveys have shown, problems may arise when using such a mirror. For instance, flight attendants have reported that the surface of the mirror is often dirty and that the angle of reflection of the mirror may be convenient for one flight attendant, while it is inconvenient for another flight attendant, depending on their height, the seat height and the viewing direction.

A further problem which has become known from the prior art is that it is not possible to fit a mirror on every interior wall of the passenger cabin, since the appropriate installation space is already blocked owing to other demands on the passenger cabin. For instance, as already stated, it is necessary that the mirror is not fitted at a place where it may restrict the space for movement of the flight attendants or the passengers and obstruct them (for example in an emergency situation) by, for example, projecting into the aisle between the seat rows.

Furthermore, for example in the area of the fittings, the installation space is blocked by the requirement for unrestricted accessibility to the doors, to receptacles for the boxes, trolleys or to other elements (e.g. in the galley). Moreover, part of the installation space in the galley of an aircraft is blocked by fixedly installed electrical appliances (e.g. coffee machine), so that if a mirror were attached to a wall located therebehind the field of view would be impaired by these appliances. Thus, in many areas of the passenger cabin, mirror arrangements can be fitted only with great difficulties and while taking account of many other demands on the passenger cabin.

Against this background, an object of the present invention is to provide a further-developed mirror arrangement which ensures simple fitting of a mirror arrangement and at the same time enables the flight attendants to have a good view over the passenger cabin.

This object is achieved according to a first aspect of the invention by a mirror arrangement which comprises at least one mirror element for reflecting light and a mirror mount for fastening the at least one mirror element inside the passenger cabin, the mirror mount comprising a holder, to which the at least one mirror element can be fastened and which is displaceable relative to the passenger cabin.

According to this first aspect of the invention, the mirror arrangement is not fitted rigidly, i.e. immovably, on an interior wall of the passenger cabin, but in such a way that it is displaceable relative to the passenger cabin, i.e. displaceable along one or more displacement axes and/or pivotable about one or more pivot axes. This, in turn, has the advantage that the mirror arrangement can be adjusted by the flight attendant to his or her height, seat height and viewing direction. Furthermore, the angle of view can be adjusted, so that a good view over the passenger cabin can be ensured.

The mirror element may, as required, be of flat or convex design or have a special surface (e.g. in the manner of a Fresnel lens). Furthermore, it is possible to fasten a plurality of mirror elements to the holder, for example a flat mirror element in combination with a smaller or larger concave mirror element and the like. The mirror element may be produced from any conceivable material which allows reflection of light and thus enables a mirroring of the passenger cabin on its surface.

Furthermore, according to a second aspect of the invention, the holder can be movable between a working position and a rest position, the mirror mount comprising a receiving opening, in which the holder can be at least partially received in its rest position.

Such a mirror arrangement has the advantage over the prior art that, as long as the holder is in its rest position, it takes up little if any accessible installation space inside the aircraft cabin and thus does not restrict or only slightly restricts the mobility of the flight attendants or the passengers. Only when the mirror, i.e. the mirror element for reflecting light, is to be used, for example in the aforementioned situations where the flight attendant has occupied his or her seat, is the holder to which the mirror element is fastened moved into a working position.

In this way, the mirror arrangement can also be fitted at places where a fixedly mounted mirror would be felt to be disturbing, since the latter restricts the freedom of movement of the flight attendants or the passengers or the accessibility, for example, of elements of the galley, lavatories or crew rest compartment. By virtue of the movability of the holder, in contrast, it can be ensured that in situations where a fixed mirror would be felt to be disturbing, the movable mirror can be moved into its rest position, in which it is at least partially received in a receiving opening and thus takes up less installation space in the accessible passenger cabin than in its working position.

The receiving opening of the mirror mount may be arranged on a so-called monument, for example in a side wall of the galley, lavatory or crew rest compartment, or else in a partition wall for the individual seating classes and the like. The receiving opening may also extend in various directions, i.e. perpendicularly, parallel or obliquely in relation to the floor of the passenger cabin. The holder, together with the at least one mirror element fastened thereto, may be partially received in the receiving opening, but in a preferred embodiment is designed to be completely receivable therein.

The holder, to which the at least one mirror element can be fastened, may furthermore be designed to be displaceable along a displacement axis from its rest position into its working position. Alternatively or additionally, the holder, to which the at least one mirror element can be fastened, may be designed to be pivotable about at least one pivot axis from its rest position into its working position. Thus, a linear movement of the holder relative to the receiving opening, a rotary movement and also a combined linear and rotary movement of the holder relative to the receiving opening are conceivable, in order to move the holder from its rest position into its working position and back.

In a development of the invention, the holder may be designed to be pivotable in its working position about at least one pivot axis. In this case, the pivot axis about which the holder is pivotable into its working position may be a different pivot axis from that about which the holder is pivotable from its rest position into its working position. By virtue of the fact that the holder is likewise pivotable in its working position, it is ensured that the flight attendant can adjust the holder for an optimum angle of view, depending on his or her own seat height and viewing direction. In this case, it is of course also conceivable for the holder to be pivotable in its working position about a plurality of pivot axes.

Furthermore, the holder with the at least one mirror element may be secured by pivoting in the working position (adjusted working position) against movement back into the rest position when in its adjusted working position it can no longer be received in the receiving opening. This may be achieved, for example, by pivoting the holder in its working position about the displacement axis or about an axis running transversely (i.e. not parallel) to the displacement axis, after it has been displaced along the displacement axis from the rest position into the working position. It is likewise conceivable to secure it in its working position by pivoting about a pivot axis which runs transversely to the pivot axis about which it has been pivoted in order to bring it from the rest position into the working position.

Furthermore, the holder may have two pivot pins which jointly form the pivot axis, corresponding bearing points, at which the pivot pins are rotatably supported, being provided inside the receiving opening. In this embodiment, the pivot pins are aligned coaxially with one another and extend in opposite directions away from the holder. The bearing points may be formed, for example, by projections or the like. Upon movement of the holder into its working position by displacement, the bearing points may additionally constitute a safeguard against undesired complete removal of the holder from the receiving opening.

Alternatively, an embodiment with a single through pivot pin which is fitted on the holder and the free ends of which can be supported at the bearing points is, of course, also conceivable.

In a development of the invention, the bearing points may comprise bearing openings and the pivot pins may be designed to be displaceable along their longitudinal axis relative to the holder. This embodiment is particularly advantageous because the pivot pins, owing to their relative displaceability, can engage in the two bearing openings formed as bores (blind bore or through bore) and thus enable, besides the rotatable mounting of the holder, also securing of the holder in its working position. Only when the pivot pins are displaced back again from their engagement position do they free the bearing openings and allow movement of the holder into its rest position.

The mirror mount may furthermore have at least two guide faces which bound the receiving opening and are designed to guide the holder when it is moved between its working position and its rest position. In order to enable, besides such a guided movement of the holder, also its smooth running, i.e. movement with as little friction as possible, roller bearings or the like may be additionally provided on the guide faces and arranged between the guide faces and the holder.

In addition, the mirror arrangement according to the invention may be designed in such a way that the mirror mount comprises a drive unit which is designed to drive and thereby displace the holder. Such a drive unit may be designed as an active or passive component. An example of a passive component is a spring or another elastic element which owing to its elasticity produces a restoring force which drives the holder and thereby brings about at least some of the displacing movement. An active component may comprise a hydraulic, electrical or pneumatic drive unit which brings about displacement of the holder.

In particular, a drive unit designed as an active component may be advantageous in order, for example in emergency situations, to bring the holder with the mirror element automatically into a position (e.g. the rest position of the holder partially or completely retracted in the receiving opening) in which, as far as possible, it does not impair the space for movement of the flight attendants and passengers.

Irrespective of the design, the mirror mount can be fittable on a monument inside the passenger cabin of the aircraft. In a design variant with a mirror mount having a receiving opening, the latter can furthermore be formed in a side wall of the monument, for example in a side wall of the galley, lavatory or crew rest compartment, or else in a partition wall for the individual seating classes and the like.

Alternatively, however, the mirror mount can also be fittable on an aircraft seat inside the passenger cabin of the aircraft. In a design variant with a mirror mount having a receiving opening, the latter can additionally be formed in a backrest of the aircraft seat.

Lastly, the mirror element can be arranged, in the working position of the holder—i.e. in the design variant in which the mirror mount does not have a holder movable between the working position and a rest position, in the mounted position of the mirror element—in such a way that it enables a reflection of the light into an area of the passenger cabin arranged behind the mirror element in relation to the direction of flight of the aircraft. In this way, even when a flight attendant has occupied his or her seat (oriented in the direction of flight), he or she has a view over a rear part of the passenger compartment via the mirror arrangement.

Figure 2:
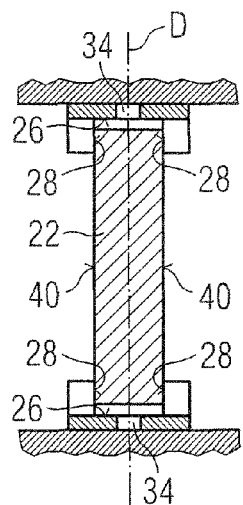
Figure 3:
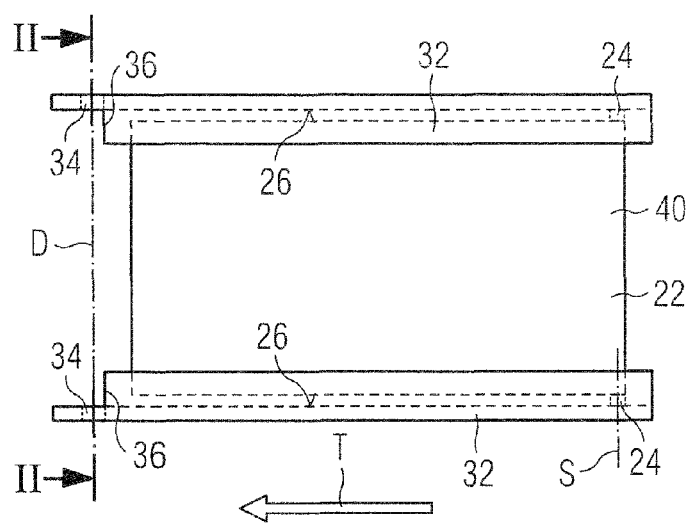
Figure 4:
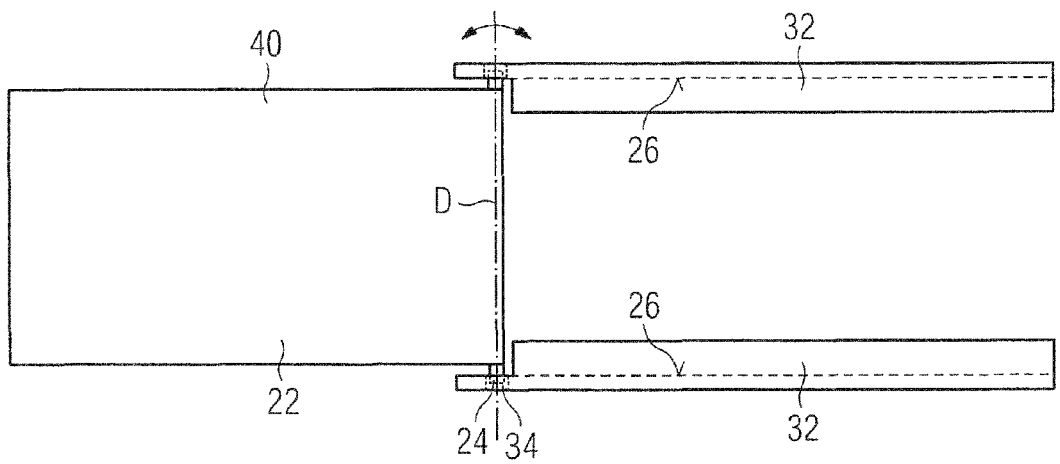
Figure 5A:
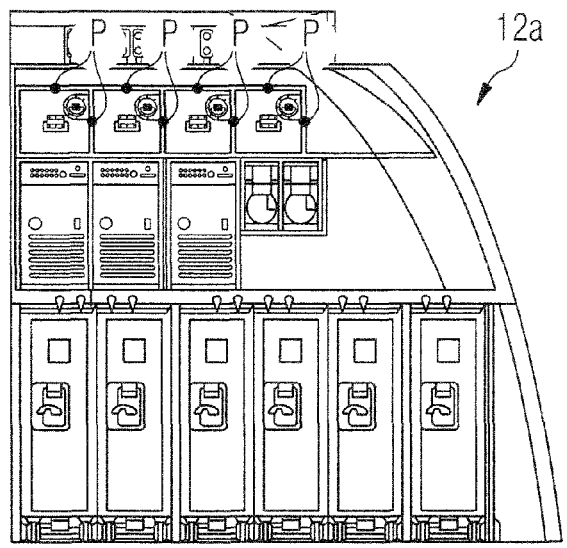
Figure 5B:
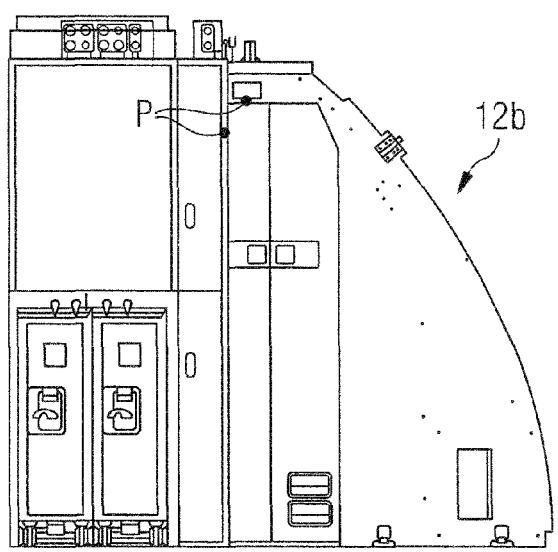
Figure 5C:
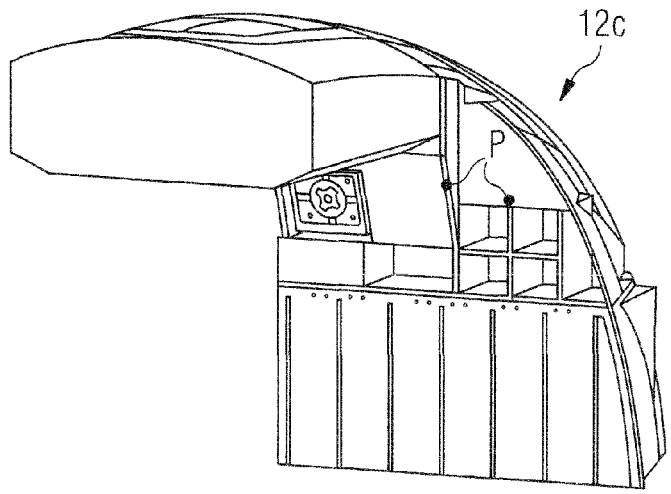
Figure 6:
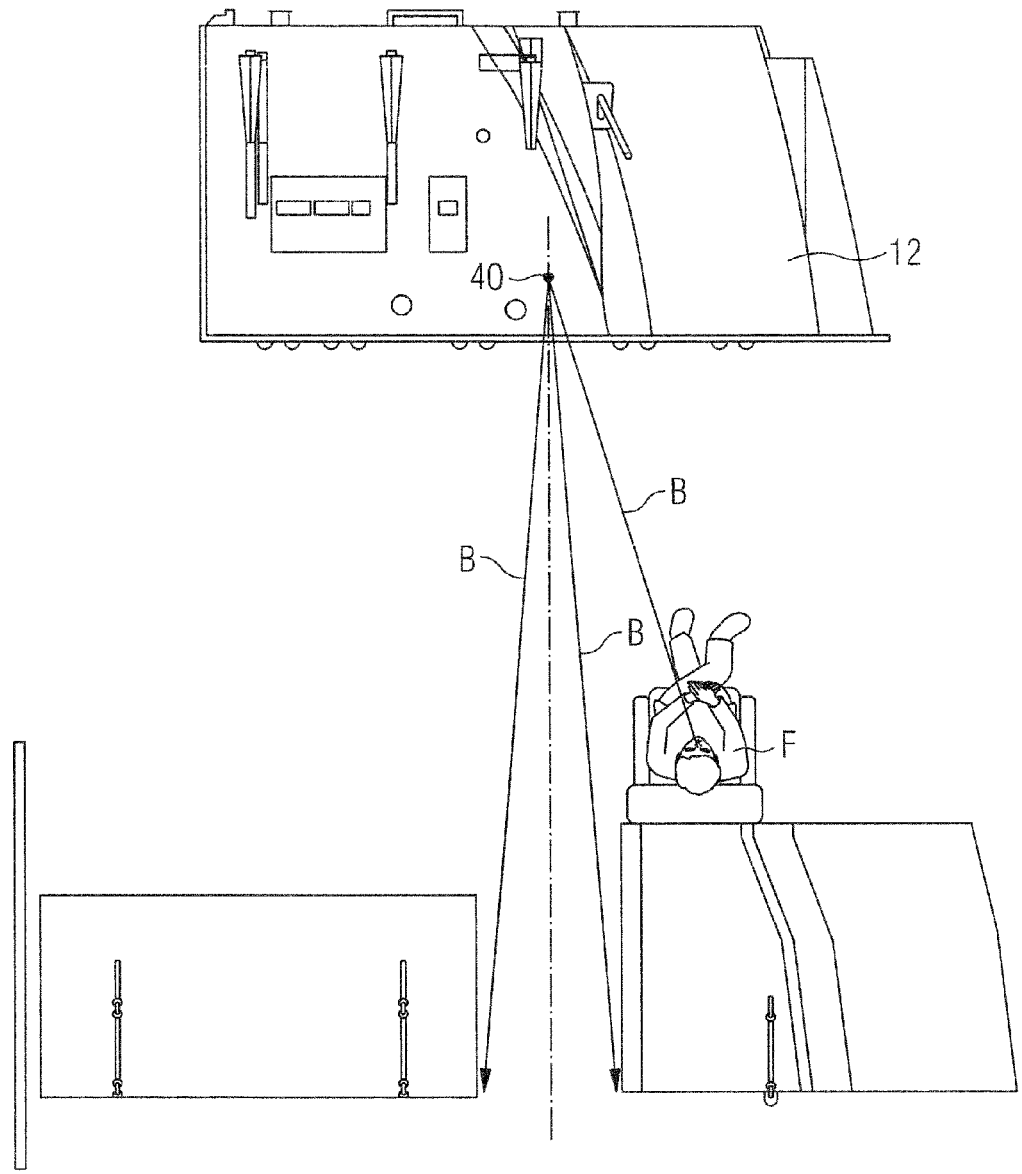

An embodiment of the invention is explained below with reference to the appended schematic figures, in which:

FIG. 1 shows a perspective view of the mirror arrangement according to the invention in the installed state, FIG. 2 shows a sectional view, along the line II-II of FIG. 3, of the mirror arrangement according to the invention in its rest position, FIG. 3 shows a side view of the mirror arrangement according to the invention in its rest position, FIG. 4 shows a side view of the mirror arrangement according to the invention in its working position, FIGS. 5a-c show different possible installation situations of the mirror arrangement according to the invention in a passenger cabin of a commercial aircraft, and FIG. 6 shows a schematic view of the possible field of view of a mirror arrangement according to the invention of FIGS. 1 to 5c in the installed stated.

In FIG. 1 there can be seen a mirror arrangement 10 according to the invention in the installed state. The mirror arrangement 10 is fitted on a so-called monument 12 in a passenger cabin and comprises a mirror mount 20 for fastening a mirror element 40. The mirror mount 20 has both a holder 22 and a receiving opening 30 (indicated by dashes in FIG. 1) which is formed in a side wall 18 of the monument 12. As indicated by the arrow Z in FIG. 1, the holder 22 of the mirror mount 20 can be pulled out of the receiving opening 30 by a pulling-out movement. The mirror element 40 is formed, for example, by a reflective film or the like which is attached to the holder 22 as explained below (cf. FIG. 2).

In the embodiment illustrated, the monument 12 comprises, below the cabin ceiling 14, recesses for receiving boxes 16 or the like which are bounded by side walls. In FIG. 1, the receiving opening 30 is formed in the side wall 18 of the monument 12. Alternatively, an arrangement, for example, in one of the other side walls is, however, also possible, as indicated by P in FIG. 1 and FIGS. 5a to c.

FIGS. 2 to 4 show one possible embodiment of a mirror arrangement 10 according to the invention, with the holder 22 of the mirror mount 20 being situated in its rest position, i.e. inside the receiving opening 30, in FIGS. 2 and 3, whereas it has been moved out of the receiving opening 30 in the illustration shown in FIG. 4 and is situated in its working position. The mirror element 40 is formed, for example, by a reflective film which is adhesively bonded to the holder 22 and thus provides a reflective surface. Alternative designs are, of course, likewise conceivable, for example where a mirror element made of glass or the like is applied to the holder 22 by adhesive bonding or other joining processes. It is also possible to attach mirror elements to both faces of the holder 22, as shown in FIG. 2, thereby enabling the use of both sides of the holder 22 in its working position as a mirror. Furthermore, the mirror element 40 does not necessarily have to cover the entire face of the holder 22, as shown in FIG. 2 to FIG. 4, but may only cover a partial area. A plurality of mirror elements 40 may also be arranged above one another or beside one another, instead of one mirror element 40, on a face of the holder 22.

In the embodiment shown in FIGS. 2 to 4, the receiving opening 30 is bounded by guide rails 32 which each have two lateral guide faces 28 facing one another and a guide face 26 connecting them. With the aid of these guide rails 32, it is ensured that the holder 22 is securely guided upon movement out of or into the receiving opening 30. Instead of such guide rails 32, however, it is also possible to bound the receiving opening 30 only by its side faces, which may likewise serve to guide the holder 22 with the mirror element 40.

Particularly advantageously, there are attached to the guide faces 28 facing the mirror elements 40 materials which enable the mirror elements 40 to slide along on the guide faces 28 with as little friction as possible. In the configuration variant, shown in FIGS. 2 to 4, with guide rails 32, the contact area of the mirror elements 40 with the guide faces 28 is relatively small, so that possible scratching of the reflective surface of the mirror elements 40 by the guide rails 32 is limited to this area. Alternatively, the mirror element 40 could also be attached only in the region of the holder 22 which does not come into contact with the guide faces 28 of the guide rails 32. Furthermore, it is also conceivable, however, to apply an intermediate layer made of soft material, for example of felt or the like, to the guide faces 28, which prevents scratching of the reflective surface of the mirror element 40 and optionally even enables automatic cleaning of the mirror elements 40 in the contact area upon movement of the holder 22 relative to the receiving opening 30.

It is likewise possible to provide in the region of the guide faces 26 friction-reducing materials or elements, for example roller bearings or the like, which enable the holder 22 to slide along on the guide faces 26 with as little friction as possible.

The holder 22 is displaced, in a movement along a displacement axis T, from its rest position into a working position (cf. FIG. 4). In its working position, it can then be pivoted about a rotation axis D relative to the receiving opening 30 which is bounded by the guide rail 32. For this purpose, the guide rails 32 have two bearing openings 34, in which two corresponding pivot pins 24 of the holder 22 can engage. Furthermore, shoulders 36 at which the guide faces 28 end are formed in each case in the region of the bearing openings 34, to enable pivoting of the holder 22.

In the illustrated embodiment of FIGS. 3 and 4, the journals or pivot pins 24 are formed so as to be movable along their longitudinal axis S, so that they enable displacement of the holder 22 along the guide faces 26 from the rest position into the working position and can engage, in the working position, into the bearing openings 34 of the guide rails 32. In order for the pivot pins 24 to be movable relative to the holder 22, they may be arranged as separate elements on the latter, in which case they can be moved at least partially relative to the latter, for example with the aid of a spring or the like. A telescopic embodiment is likewise conceivable, just as well as the design as pivot pins which can be partially sunk into the holder 22. Alternatively, other possible configurations are, of course, also conceivable, in which the journals 24 are formed integrally with the holder 22 and instead of bearing openings 34 there is provided in the region of the guide faces 26 of the guide rails 32 a bearing shoulder which enables a rotatable mounting of the pivot pins about the rotation axis D.

In FIGS. 5a to 5c, further possible installation situations for a mirror arrangement 10 according to the invention are indicated by P. Thus, FIG. 5a schematically shows a galley 12a of a passenger cabin of an aircraft, while FIG. 5b shows a lavatory 12b and FIG. 5c a flight crew rest compartment 12c. The mirror arrangement 10 may be installed both in the vertical and in horizontally running side walls of the respective monuments 12a to 12c.

Alternatively, however, a mirror arrangement according to the invention may also be fitted on an aircraft seat, while a corresponding receiving opening may be formed on the backrest of the aircraft seat. Furthermore, however, it is also conceivable to fit a mirror arrangement according to the invention at other places in the passenger cabin, for example by forming a receiving opening for the holder in the side walls of other elements in the passenger compartment (in partition walls of the stowage compartments, in partition walls for dividing up the passenger cabin and the like).

In FIG. 6, lastly, a top view of a passenger cabin of an aircraft is shown, in which a flight attendant F has occupied his or her seat and with the aid of a mirror arrangement according to the invention can watch over the rear area of the passenger cabin. The viewing direction is indicated here by the arrows denoted by "B" in FIG. 6. It becomes clear from FIG. 6 that the flight attendant F, even when sitting, can watch not only over the area of the passenger cabin located in front of him or her (in the direction of flight), but also the area located behind the mirror element 40 and behind him or her.

According to one aspect, in a mirror arrangement according to the invention, the holder is displaceable in its working position, so that a flight attendant may appropriately adjust the holder according to his or her height, seat height and viewing direction, in order to be able to watch over the area of the passenger cabin which he or she desires.

Moreover, by virtue of the fact that the mirror arrangement according to the invention comprises a mirror mount in which the holder together with the mirror element can be at least partially received in a receiving opening, the holder in its rest position does not take up any installation space required for other purposes in the passenger cabin of the aircraft. Thus, the space for movement available to the flight crew and passengers, which is insufficient in a commercial aircraft anyway, is not restricted further by additional mirror arrangements. Only when the flight attendants have occupied their seats and the mirror arrangement is to be used to monitor the passenger cabin, is the holder together with the mirror element brought into its working position by moving it out of the receiving opening. Since the flight attendants as well as the passengers are required anyway to remain in their seats in such situations (for example during take-off and landing of the aircraft, in the event of turbulence during the flight and the like), the mirror situated in its working position does not constitute a restriction of the freedom of movement.

Besides manual adjustability, automatic adjustment may also be useful. For example, with the aid of a drive unit, displacement of the holder may be achieved in certain situations semi-automatically (by manual activation) or automatically.

The invention claimed is:

1. Mirror arrangement for monitoring a passenger cabin of an aircraft, comprising:
    at least one mirror element for reflecting light and
    a mirror mount for fastening the at least one mirror element inside the passenger cabin,
the mirror mount comprising a holder, to which the at least one mirror element is fastenable and which is displaceable relative to the passenger cabin,
wherein the holder is movable between a working position and a rest position, and wherein the mirror mount further comprises a receiving opening, in which the holder is at least partially receivable in its rest position, the holder, to which the at least one mirror element is fastenable, designed to be pivotable about at least one pivot axis and having two pivot pins which jointly form the pivot axis, and wherein corresponding bearing points, at which the pivot pins are rotatably supported, are provided inside the receiving opening, the bearing points comprising bearing openings and wherein the pivot pins are designed to be displaceable along the pivot axis relative to the holder, wherein the mirror mount has at least two pairs of guide faces which bound the receiving opening and are designed to guide the holder when it is moved between its rest position and its working position.

2. Mirror arrangement according to claim 1,
    wherein the holder, to which the at least one mirror element is fastenable, is designed to be displaceable along a displacement axis from its rest position into its working position.

3. Mirror arrangement according to claim 1,
    wherein the holder is designed to be pivotable in its working position about the at least one pivot axis.

4. Mirror arrangement according to claim 1,
    wherein the mirror mount further comprises a drive unit which is designed to drive and thereby displace the holder.

5. Mirror arrangement according to claim 1,
    wherein the mirror mount is fittable on a monument inside the passenger cabin of the aircraft.

6. Mirror arrangement according to claim 5,
    wherein the receiving opening of the mirror mount can be formed in a side wall of the monument.

7. Mirror arrangement according to claim 1,
    wherein the mirror mount is fittable on a passenger seat in the passenger cabin of the aircraft.

8. Mirror arrangement according to claim 7,
    wherein the receiving opening of the mirror mount can be formed in a backrest of the passenger seat.

9. Mirror arrangement according to claim 1,
    wherein the mirror element is arranged, in the working position of the holder, in such a way that it enables a reflection of the light into an area of the passenger cabin arranged behind the mirror element in relation to the direction of flight of the aircraft.

\* \* \* \* \*